United States Patent
Ranasinghe et al.

(10) Patent No.: US 6,347,520 B1
(45) Date of Patent: Feb. 19, 2002

(54) METHOD FOR KALINA COMBINED CYCLE POWER PLANT WITH DISTRICT HEATING CAPABILITY

(75) Inventors: Jatila Ranasinghe, Niskayuna; Raub Warfield Smith, Ballston Lake, both of NY (US); Robert William Bjorge, Highland, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/778,016

(22) Filed: Feb. 6, 2001

(51) Int. Cl.$^7$ ............................................... F01K 25/06
(52) U.S. Cl. ........................ 60/649; 60/651; 60/653; 60/671; 60/39.04; 60/39.182
(58) Field of Search ................. 60/39.04, 39.182, 60/649, 651, 671, 653

(56) References Cited

U.S. PATENT DOCUMENTS

| | | |
|---|---|---|
| 4,753,063 A * | 6/1988 | El-Masri .................. 60/39.511 |
| 5,029,444 A | 7/1991 | Kalina |
| 5,095,708 A | 3/1992 | Kalina |
| 5,440,882 A | 8/1995 | Kalina |
| 5,450,821 A | 9/1995 | Kalina |
| 5,649,426 A | 7/1997 | Kalina et al. |
| 5,822,990 A | 10/1998 | Kalina et al. |
| 6,173,563 B1 * | 1/2001 | Vakil et al. ................. 60/39.02 |
| 6,216,436 B1 * | 4/2001 | Ranasinghe et al. ........ 60/39.02 |

\* cited by examiner

*Primary Examiner*—Hoang Nguyen
(74) *Attorney, Agent, or Firm*—Nixon & Vanderhye P.C.

(57) ABSTRACT

A method is provided for implementing a thermodynamic cycle with district water heating capabilities that combines a simplified Kalina bottoming cycle with a district water heating plant. The preferred method includes pressurizing, vaporizing and superheating a mixture working fluid (e.g., $H_2O/NH_3$) using gas turbine exhaust energy in a heat recovery vapor generator, expanding the working fluid in a turbine to produce power, and then transferring the working fluid thermal energy to the district water by condensing the working fluid in a single stage condenser. The method can also include systems that efficiently use excess thermal energy only when the district water heating demand is low, e.g., during summer months. The method according to the invention provides for economically significant increases in district water heating efficiency as compared to conventional Rankine cycles with district water heating, while decreasing the cost of both the Rankine and nominal Kalina cycles using multi-component working fluids.

8 Claims, 2 Drawing Sheets

Kalina Cycle System Conceptual Diagram
For CC Power Plants With District Heating

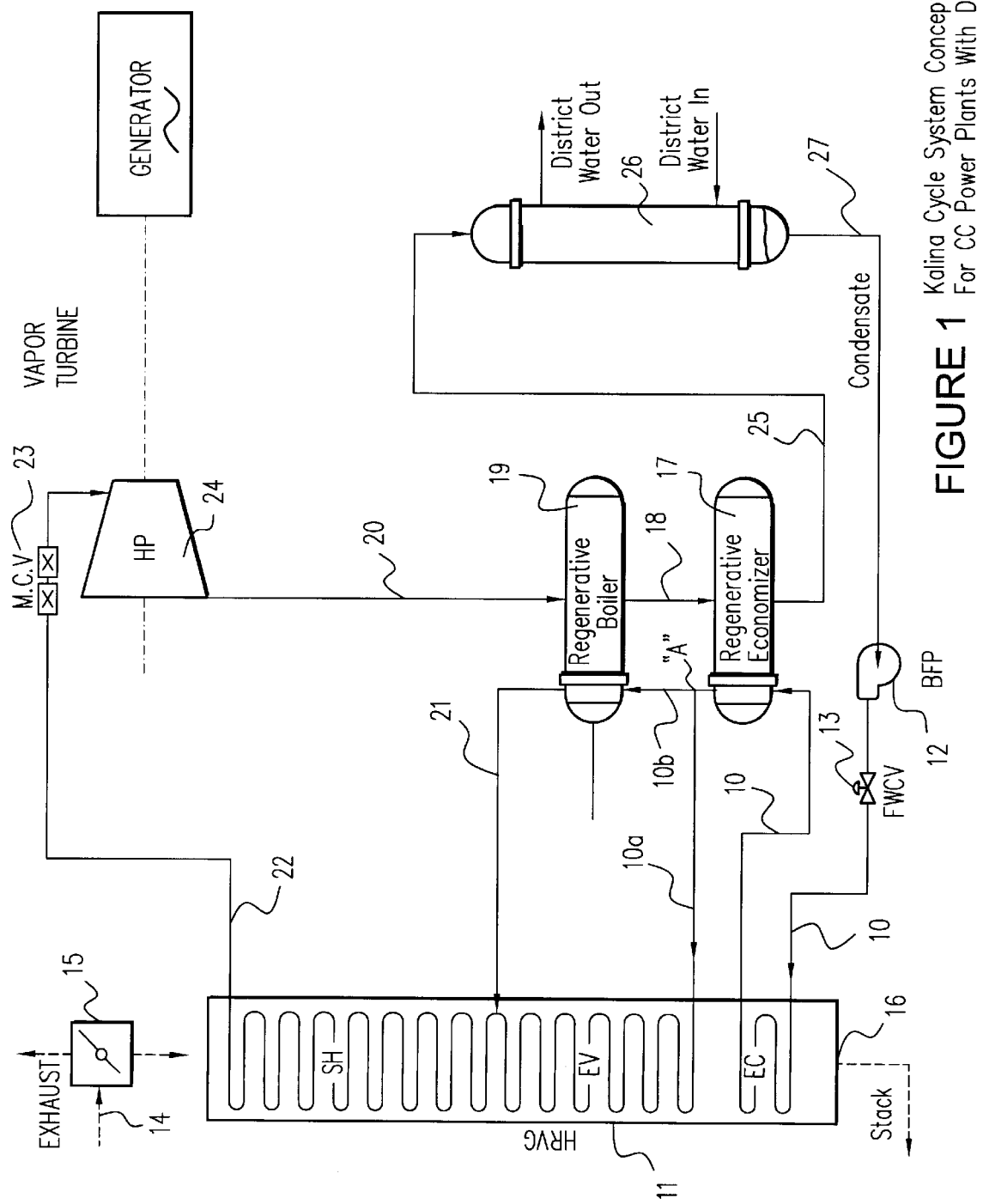
FIGURE 1  Kalina Cycle System Conceptual Diagram For CC Power Plants With District Heating

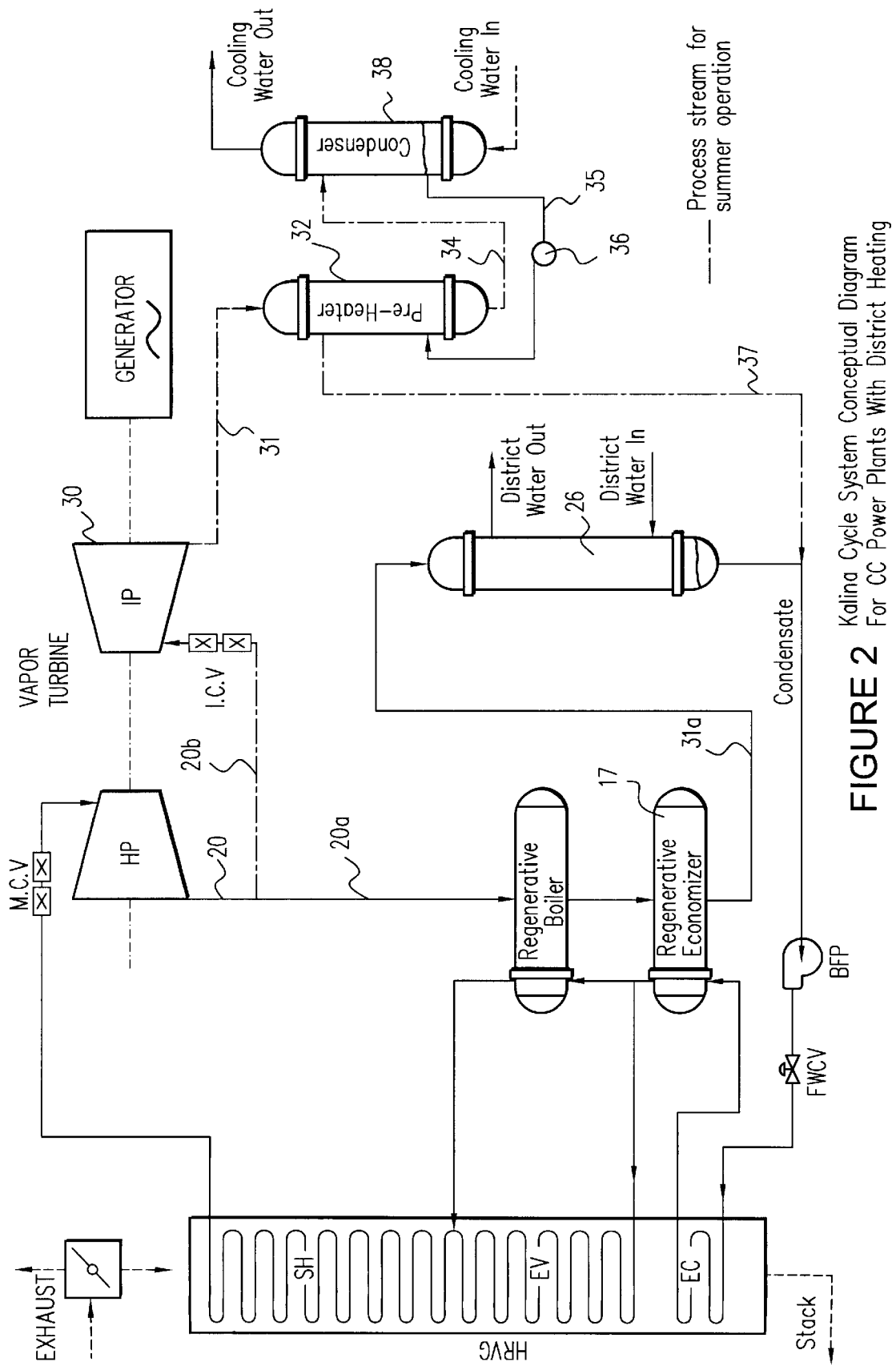
FIGURE 2  Kalina Cycle System Conceptual Diagram
For CC Power Plants With District Heating

METHOD FOR KALINA COMBINED CYCLE POWER PLANT WITH DISTRICT HEATING CAPABILITY

BACKGROUND OF THE INVENTION

The present invention relates to a method and apparatus for improving the efficiency of a combined cycle power plant using excess thermal energy from the gas turbine exhaust of a power plant to supply hot water ("district water") to a hot water system or network in a more thermally efficient manner. In particular, the invention relates to a new method for converting excess thermal energy into electric power by integrating a modified Kalina-type thermodynamic cycle into a district heating and cooling system in an efficient and cost-effective manner. The principal benefit of the new method is the recovery of additional heat for use with district water, which in turn can be used to heat homes and buildings by conventional means (e.g., radiators or other standard heat transfer devices). The invention also relates to the use of a thermal energy source from a gas turbine exhaust in a more efficient manner during the summer months (when demand for district water heating is low) by incorporating an intermediate pressure turbine into the process in an alternative embodiment in accordance with invention.

In the past, district heating and cooling systems have been integrated into power plants to take advantage of excess thermal energy sources. However, virtually all such systems have been integrated into plants that rely on traditional Rankine bottoming cycles. A conventional Rankine cycle has a relatively low thermal efficiency. Thus, the use of additional Rankine cycles to recover waste heat, particularly in bottoming cycles, normally is not cost-justified because of the efficiency losses inherent in such designs.

The Kalina thermodynamic cycle has previously been utilized to increase the thermodynamic efficiency of natural gas turbine combined cycle applications such as the process described in U.S. Pat. No. 5,440,882 (known generally as a "Kalina 6" cycle). The working fluid in a Kalina 6 cycle consists of a multi-component mixture that normally has only one low boiling point component and one high boiling point component. The preferred form of the working fluid is ammonia and water ($NH_3/H_2$), although other high and lower boiling point mixtures of different components are theoretically possible. The mixture increases the thermodynamic efficiency of the system by virtue of the non-isothermal vaporization and condensation characteristics of the multi-component fluid which allow for heat absorption and rejection but with significantly lower irreversibility. This known characteristic of Kalina cycles allows the mixture to recover heat at lower temperatures than pure water in Rankine cycles. A regenerative boiler is typically used in a Kalina cycle in order to increase the overall efficiency of the system by vaporizing part of the working fluid using the superheated vapor of the high pressure ("HP") turbine outlet, thereby increasing the vapor production in a heat recovery vapor generator ("HRVG").

A conventional Kalina cycle has not heretofore been utilized in direct combination with district water heating and cooling systems, particularly as defined by the present invention using a direct, single stage condenser, in general, Kalina cycles include complex distillation condensation subsystems ("DCSS") and are more expensive to construct and operate as compared to a Rankine cycles because they require additional process equipment and more costly materials of construction for $NH_3/H_2O$ applications.

The design in accordance with the present invention shares a common element with the conventional Kalina cycle, namely, the regenerative boiler. Nevertheless, a need remains in the art for a method to increase the thermal efficiency of the traditional Rankine cycle district water heating and cooling systems by taking advantage of the potential increases in thermal efficiency of a Kalina bottoming cycle to heat and cool district water. A need also exists to decrease the number of processing units (and overall installation and operating costs) associated with the use of a conventional Kalina cycle to perform such tasks.

The present invention achieves those objectives by integrating a thermally efficient Kalina-type bottoming cycle with district water heating and cooling loads in the manner described below. The invention also includes a regenerative economizer that functions in combination with the regenerative boiler for achieving additional thermodynamic gains.

BRIEF DESCRIPTION OF THE INVENTION

The preferred method for implementing a simplified Kalina thermodynamic cycle with a district water heating and cooling plan in accordance with the invention includes the following basic process steps:

(1) vaporizing a working fluid by transferring thermal energy from a gas turbine ("GT") exhaust to the working fluid in the HRVG;

(2) expanding the working fluid through the HP turbine to produce electric energy, as well as a shell-side heat source;

(3) transferring thermal energy from the HP turbine outlet to the working fluid through a regenerative economizer and a regenerative boiler to produce a superheated, pressurized vapor working fluid and spent exhaust stream; and (4) condensing the working fluid by transferring thermal energy to the district water.

An alternative embodiment of the invention includes steps (1) and (2), but modifies the step of expanding the vaporized working fluid by passing the expanded fluid leaving the HP turbine through a second intermediate pressure ("IP") turbine to produce additional power, condensing the working fluid through a condenser and recombining the condensed working fluid with the condensate from the district water unit.

In order to carry out the above method steps, the present invention also includes an apparatus for improving the thermal efficiency of a combined cycle plant that includes the following basic components:

a. a heat recovery vapor generator (HRVG) for vaporizing, superheating, and pressurizing a working fluid;

b. a high pressure turbine for expanding the working fluid to generate electric power;

c. an intermediate pressure turbine for expanding the working fluid to produce power;

d. a first heat exchanger for cooling the multi-component working fluid exhaust leaving the high pressure turbine, while vaporizing recycled working fluid, preferably with the high pressure exhaust stream on the shell side and the recycled fluid on the tube side; and e. a second heat exchanger downstream and in series with the first exchanger for further cooling the multi-component working fluid exhaust and heating the recycled working fluid, preferably with the vapor exhaust on the shell side and the recycled on the tube side;

f. a condenser in series with the first and second heat exchangers for condensing the cooled working fluid on one side and heating district water on the side.

In the preferred treatment method, the working fluid is pressurized, vaporized and superheated in the HRVG. The low boiling temperature component in the working fluid is combined with the high boiling temperature component to allow the mixture to capture thermal energy at a lower temperature and, in effect, store more energy. The working fluid is then expanded through the HP turbine to produce electric power in a conventional manner. The exhaust from the HP turbine then serves as a heat source for the regenerative economizer and the regenerative boiler. Thus, in the preferred embodiment, virtually all of the sensible heat from the HP turbine outlet is transferred either to the district water in the condenser or to the working fluid in the regenerative economizer and regenerative boiler.

In another aspect of the invention, the HP turbine outlet stream can be used as the working fluid for the IP turbine to create additional electric power. Integrating the district water heating system with a modified Kalina cycle in accordance with the invention results in the Kalina cycle being simplified in form, thereby reducing unit construction and operating costs. As noted above, a conventional Kalina cycle has power generation as the primary objective and thus does not include a regenerative economizer or a regenerative reboiler for use with district water. Conventional Kalina cycles also typically include significantly more complex distillation/condensation subsystems downstream from the IP turbine. Normally, such systems do not directly condense the vapor created by the HRVG, but instead rely on a multistage DCSS and plant cooling water subsystem.

The modified Kalina cycle according to the invention includes a regenerative economizer that transfers thermal energy from the superheated vapor leaving the HP turbine to the working fluid after the working fluid passes through the economizing section of the HRVG. The regenerative economizer thereby increases the thermodynamic efficiency of the system over a Rankine cycle having a district water heating cycle by making use of the excess thermal energy in the HP turbine outlet. The residual energy in the HP turbine outlet stream is then transferred to the district water for heating.

If the primary objective of the system is district water heating (rather than supplemental power generation when the ambient air temperature is low), the working fluid vapor can be directly condensed with the district water. Under those circumstances, a majority of the thermal energy from the HP turbine outlet is transferred to the district water. As a result, the condensation subsystem downstream from the IP turbine can be significantly reduced in size, complexity and cost by using a single pre-heater and a single condenser.

Table 1 shows a comparison in the thermodynamic efficiency between a 3 pressure-level reheat Rankine cycle and a Kalina cycle as used in accordance with the invention and held at a constant district heating load (~280 MW). The design case reflected in the data of Table 1 involves the use of a 9 FA+gas turbine under nominal "winter-like" conditions, i.e., 0° C. and 60% relative humidity.

TABLE 1

Efficiency Comparison of Rankine Cycle and Modified Kalina Cycle in accordance with the present invention.

|  |  | Rankine Cycle | Simplified Kalina Cycle |
|---|---|---|---|
| District Heating Load | kW | 280000 | 280000 |
| Gas Turbine Generator Output | kW | 275226 | 275226 |
| Steam/Vapor Turbine Generator | kW | 83639 | 102366 |

TABLE 1-continued

Efficiency Comparison of Rankine Cycle and Modified Kalina Cycle in accordance with the present invention.

|  |  | Rankine Cycle | Simplified Kalina Cycle |
|---|---|---|---|
| Output |  |  |  |
| Equipment Auxiliaries | kW | 1240 | 1240 |
| Net Equipment Power | kW | 357625 | 376352 |
| Plant Auxiliaries | kW | 2168 | 8796 |
| Net Plant Power | kW | 355457 | 367556 |
| Heat Consumption | Btu/hr$^\times$10 | 2505.13 | 2505.13 |
| Net Heat Rate | Btu/kW-hr | 7047.6 | 6815.6 |
| Net Combined Cycle Efficiency | % | 48.42 | 50.07 |
| Change in Net Plant Power | kW |  | 12099 |
| Change in Efficiency | % |  | 1.65 |

BRIEF DESCRIPTION OF THE DRAWINGS

FIG. 1 illustrates a modified Kalina cycle with an integrated district water heating system in accordance with the present invention.

FIG. 2 illustrates the system depicted in FIG. 1, but with an integrated secondary IP turbine, a simplified condensation system for use during the summer months to ensure more efficient use of the recovered heat energy.

DETAILED DESCRIPTION OF THE INVENTION

The Preferred Winter Embodiment

FIG. 1 depicts a typical winter embodiment of a preferred method for integrating a district water heating plan with a thermodynamic cycle in accordance with the invention. In this embodiment, the primary objective is to heat the district water when the ambient air temperature is low, e.g., during the winter months. However, the FIG. 1 embodiment can also be applied to systems where district water heating is a secondary objective, e.g., systems located in warmer climates. Specifically, FIG. 1 shows a system that contains a heat recovery vapor generator (HRVG), a high pressure turbine (HP), a regenerative boiler, a regenerative economizer, and a condenser.

As seen in FIG. 1, a working fluid 10 contains a mixture of ammonia ($NH_3$) and water ($H_2O$) and, in that sense, represents a Kalina-type multi-component working fluid. Working fluid 10 enters the bottom of the HRVG 11 in the form of a liquid after passing through the boiler feed pump 12 and the automated feed water control valve 13 (labeled "FWCV") which regulates the flow of liquid into the economizer section of the HRVG. As noted, the HRVG is a single pass design consisting of three sections—an economizing section (labeled "EC"), an evaporation section ("EV") and a superheating section ("SH"). The high temperature gas turbine exhaust 14, enters the top of the HRVG 11 after passing through a converter damper 15 that allows the exhaust to completely bypass the heat recovery cycle if necessary. The working fluid 10 absorbs thermal energy in the economizing section of the HRVG as it passes the cooler GT exhaust in the lower section of the HRVG shown exiting the HRVG at point 16. The spent exhaust 16 exits as a "stack gas" (nominally 120° C.), i.e., at a temperature somewhat lower than that of the stack gas in a conventional Rankine cycle.

The working fluid 10 likewise exits the HRVG after passing through the economizer section directly into regenerative economizer 17, preferably on the tube side, and gains thermal energy from the outlet stream 18 from the regenerative boiler 19 passing on the shell side of the regenerative economizer. The liquid working fluid 10 then splits through a three way adjustable valve as shown at point "A." A portion of the liquid working fluid identified as stream 10a, i.e., the working fluid recycle to the HRVG, reenters the evaporation stage of the HRVG as shown, picking up enough additional thermal energy from the GT exhaust to cause stream 10a to evaporate. A second liquid outlet stream from the three-way valve at point "A," namely the working fluid feed to the regenerative boiler 10b, enters the tube side of the regenerative boiler 19 and vaporizes against the HP turbine superheated vapor exhaust 20. The vaporized regenerative boiler outlet 21 reenters the HRVG and recombines with the working fluid as shown. The working fluid in the HRVG is then superheated and pressurized by the GT exhaust in the superheating section of HRVG 11. The final recombined working fluid 22 exits the HRVG as a superheated and pressurized vapor.

The combined (now reheated) working fluid 22 exists the HRVG and passes through the main control valve (labeled "M.C.V.") 23 which regulates the flow rate to the high pressure turbine 24, and then expands through the turbine as shown to produce electric power via a conventional generator. The initial superheated working fluid exits the turbine as vapor exhaust 20 at a lower pressure. The sensible heat of the vapor transfers to the liquid working fluid in the regenerative boiler 19 and regenerative economizer 17 by passing directly through both heat exchangers in series. The resulting, multi-component cooled working fluid exists the regenerative economizer via condenser feed 25. As discussed above, at a constant heating rate, the regenerative heat exchangers as used in a series flow configuration of FIG. 1 serve to significantly increase the vapor production in the HRVG by recovering additional thermal energy from the vapor, thereby increasing the overall power output.

The cooled vapor working fluid enters condenser 26 where the working fluid completely condenses against a district water supply, producing all (or substantially all) of the heat load required for the district water heating. As such, the cooled working fluid acts, in effect, as a heat sink for the bottoming cycle. Condenser 26 thus operates to produce heated district water and the working fluid condensate 27 is recycled back to the beginning of the process via boiler feed pump 12.

Preferred Summer Embodiment

FIG. 2 illustrates a typical alternative embodiment of the method according to the invention during the summer months when the objective is to increase power efficiency, depending on the district water heating demands. FIG. 2 shows a system containing, in addition to the system components of FIG. 1, an intermediate pressure ("IP") turbine 30 and a direct condensation system that includes a secondary condenser 38 and a pre-heater 32.

In the summer months, demand for district heating water normally is lower and less superheated vapor is required to operate condenser 26 in FIG. 1. In order to recover the highest amount of thermal energy from the bottoming cycle during these months, vapor exhaust 20 of the HP turbine 24 can be split into two streams, the working fluid feed to the regenerative boiler 20a and the intermediate pressure turbine feed 20b, respectively. A portion of the working fluid 20a continues in the same manner as described above in connection with the preferred winter embodiment, while the other portion (stream 20b) feeds into the IP turbine 30 where it expands to produce additional electrical energy. The IP turbine outlet enters the condensation system pre-heater 32 where it heats the condensate stream from condenser 38 in the manner shown. The pre-heater outlet stream 34 enters secondary condenser 38 and is completely condensed against the plant cooling water. The condensate stream 35 exits through circulating pump 36, gaining thermal energy in preheater 32, again preferably on the shell side. Condensate stream 37 leaving the preheater recombines with the condensate line from the district water condenser 26.

While the present invention has been described in connection with what is presently considered to be the most practical and preferred embodiments, it is to be understood that the invention is not to be limited to the disclosed embodiments but is intended to cover various modifications and equivalent arrangements included within the spirit and scope of the appended claims.

What is claimed is:

1. A method for increasing the thermal efficiency of a combined cycle power plant using excess thermal energy to treat a municipal water source, comprising the steps of:
    a. vaporizing and superheating a multi-component working fluid by transferring thermal energy from a gas turbine exhaust to said working fluid in a heat recovery vapor generator;
    b. first expanding the working fluid through a high pressure turbine to produce electric energy and a heat source for a downstream regenerative economizer and a regenerative boiler;
    c. transferring thermal energy from the outlet of said high pressure turbine to said working fluid through said regenerative economizer and said regenerative boiler; and
    d. condensing said working fluid by transferring thermal energy to said municipal water source.

2. A method as recited in claim 1, wherein said working fluid comprises a mixture of ammonia and water.

3. A method as recited in claim 1 wherein said working fluid becomes superheated as a result of the transfer of thermal energy from said gas turbine exhaust to said working fluid.

4. A method as recited in claim 1, further comprising the step of expanding a portion of the vaporized working fluid exiting from said high pressure turbine through a second intermediate pressure turbine to produce additional electric power.

5. A method as recited in claim 4 further comprising the steps of condensing said vaporized working fluid from said intermediate pressure turbine through a condenser and recombining the resulting condensed working fluid with said working fluid.

6. An apparatus for implementing a thermodynamic cycle to heat a district water supply comprising:
    a. a heat recovery vapor generator for vaporizing and superheating a multi-component working fluid;

b. a high pressure turbine for expanding said working fluid to generate electric power;

c. a regenerative boiler for cooling said working fluid on one side while vaporizing recycled working fluid on the other side;

d. a regenerative economizer for cooling said working fluid on one side and heating said recycled working fluid on the other side; and e. a condenser for condensing said working fluid on one side and heating aid district water on the other side.

7. An apparatus as claimed in claim 6, wherein said regenerative economizer and said regenerative boiler consist of shell-and-tube heat exchangers.

8. An apparatus as claimed in claim 6 further comprising a. an intermediate pressure turbine downstream from said high pressure turbine for further expanding said working fluid to generate additional electric power;

b. a preheater for heating recycled working fluid on one side and cooling the intermediate pressure turbine exhaust on the other side; and c. a secondary condenser in series with said preheater for condensing said recycled working fluid using plant cooling water.

* * * * *

UNITED STATES PATENT AND TRADEMARK OFFICE
CERTIFICATE OF CORRECTION

PATENT NO.    : 6,347,520 B1  
DATED         : February 19, 2002  
INVENTOR(S)   : Ranasinghe et al.

It is certified that error appears in the above-identified patent and that said Letters Patent is hereby corrected as shown below:

Column 1,
Line 42, change "($NH_3/H_2$)" to -- $NH_3/H_2O$) --

Column 5,
Lines 23 and 33, change "exists" to -- exits --.

Signed and Sealed this

Fourth Day of June, 2002

Attest:

JAMES E. ROGAN
Attesting Officer     Director of the United States Patent and Trademark Office